United States Patent [19]

Davis, Jr. et al.

[11] 3,810,090
[45] May 7, 1974

[54] PNEUMATIC TIRE LOW PRESSURE MONITORING AND WARNING SYSTEM
[75] Inventors: Henry Davis, Jr.; Donald E. Church, both of Richmond, Ind.
[73] Assignee: Avco Corporation, Richmond, Ind.
[22] Filed: Sept. 15, 1972
[21] Appl. No.: 289,702

[52] U.S. Cl................ 340/58, 325/111, 200/61.22
[51] Int. Cl............................................ B60c 23/04
[58] Field of Search........ 340/58; 325/15, 111, 117; 200/61.22, 61.25, 61.26

[56] References Cited
UNITED STATES PATENTS
| | | | |
|---|---|---|---|
| 3,694,803 | 9/1972 | Strenglein............................ | 340/58 |
| 3,588,815 | 6/1971 | Koonce................................ | 340/58 |
| 3,662,335 | 5/1972 | Fritze.................................. | 340/58 |
| 2,860,321 | 11/1958 | Strickland et al..................... | 340/58 |

Primary Examiner—Alvin H. Waring
Attorney, Agent, or Firm—Bertram H. Mann

[57] ABSTRACT

An improved pneumatic tire low pressure monitoring and warning system is provided which senses a low pressure condition in a pneumatic tire and employs a transmitter which is fixed to a rotatable support for rotation therewith. The transmitter is located off center from the central axis of rotation of the rotatable support and is actuated by sensing means to provide pulse modulated output signals at a radio frequency in response to a low pressure condition in the tire. A receiver is provided for receiving the signals and such receiver operates to improve the character of the output signals while removing undesirable signals and such receiver activates an indicating device in response to a low pressure condition in the pneumatic tire.

13 Claims, 23 Drawing Figures

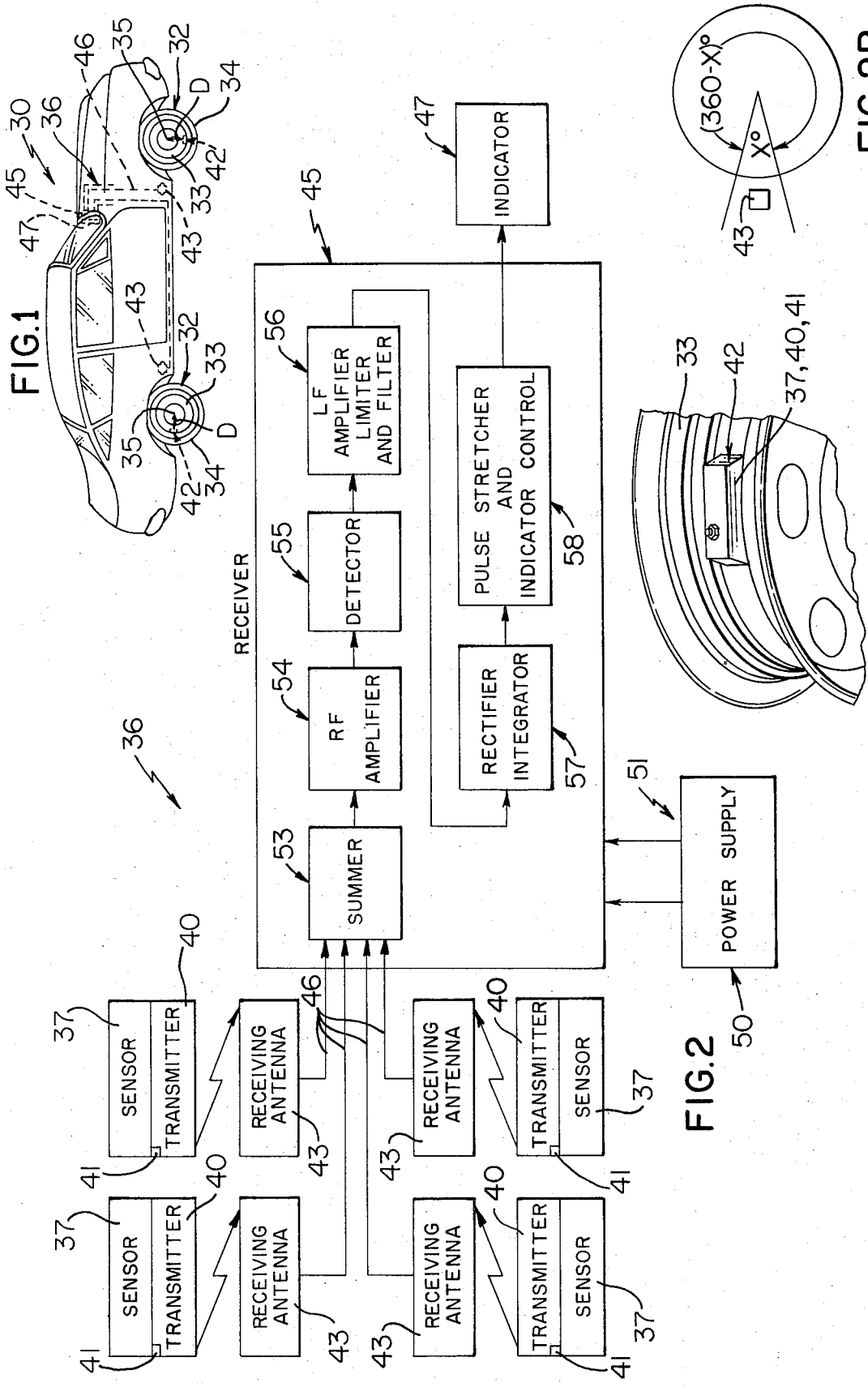

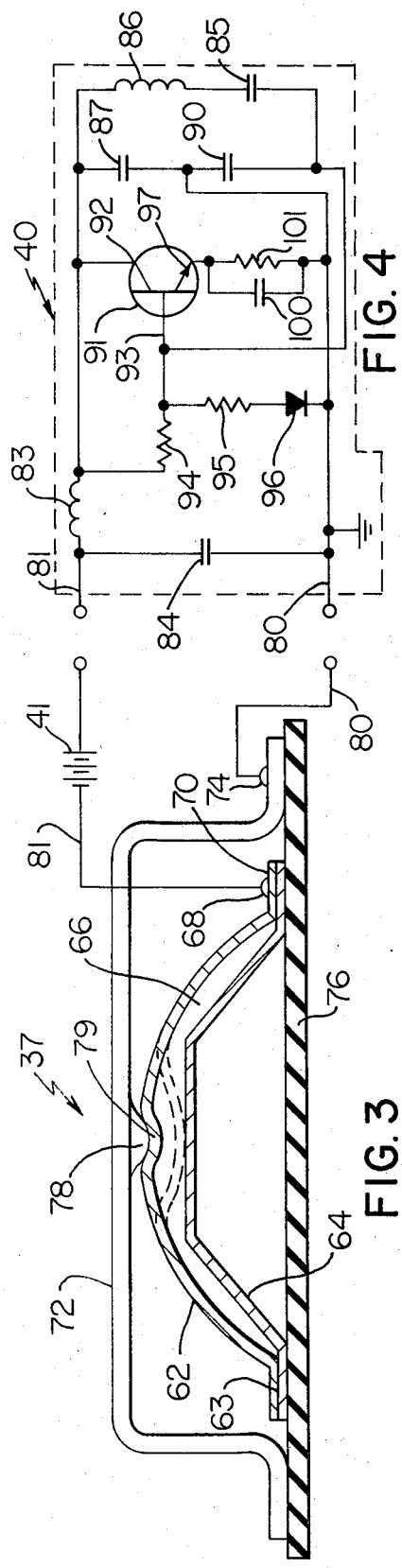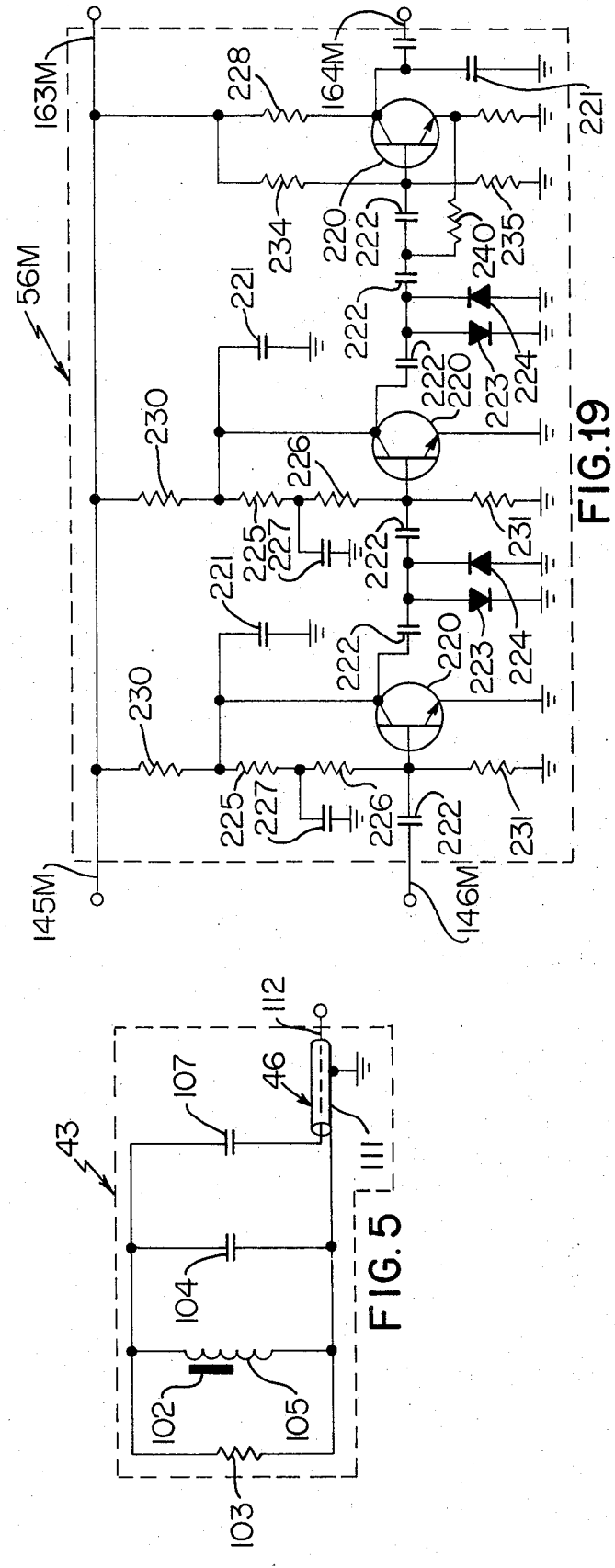

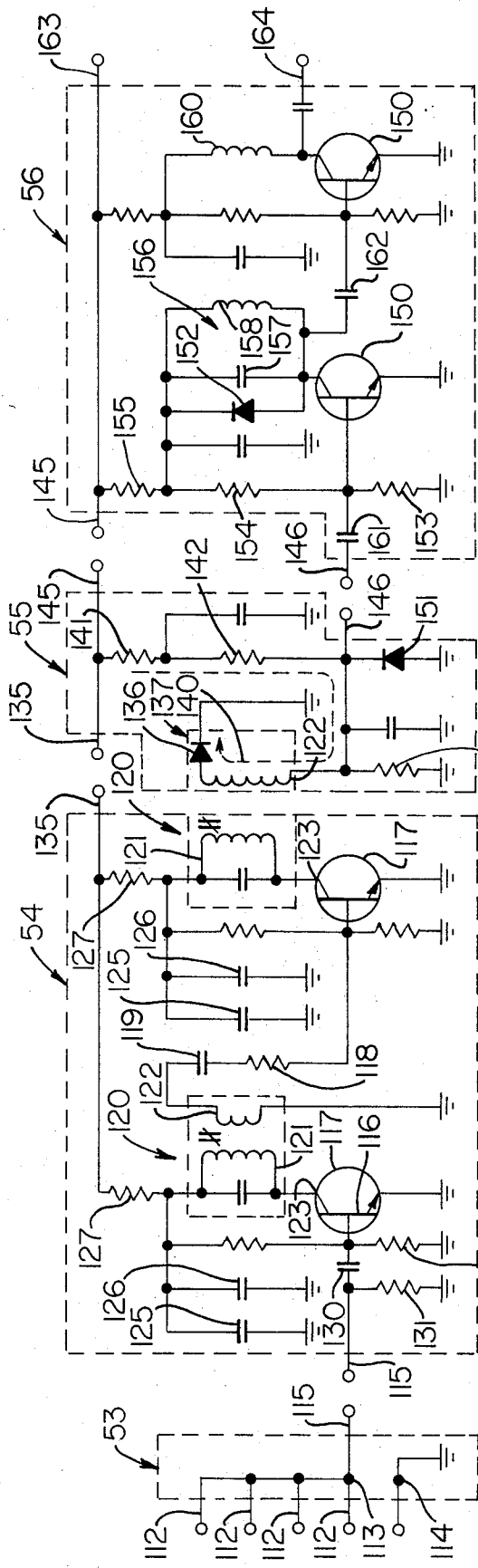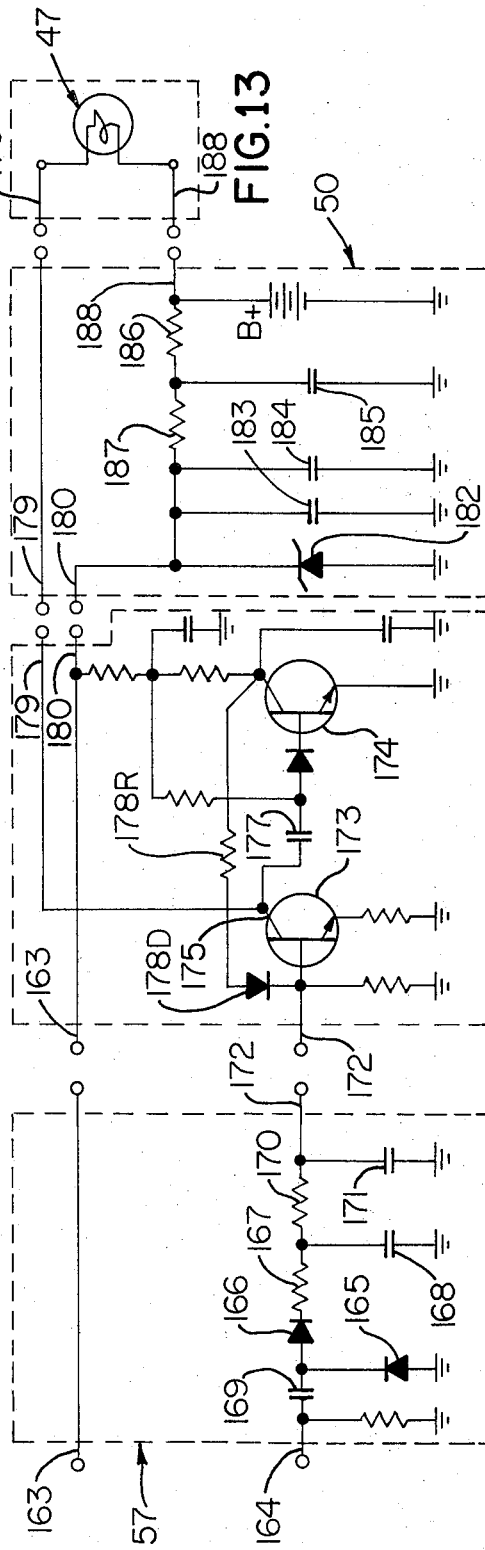

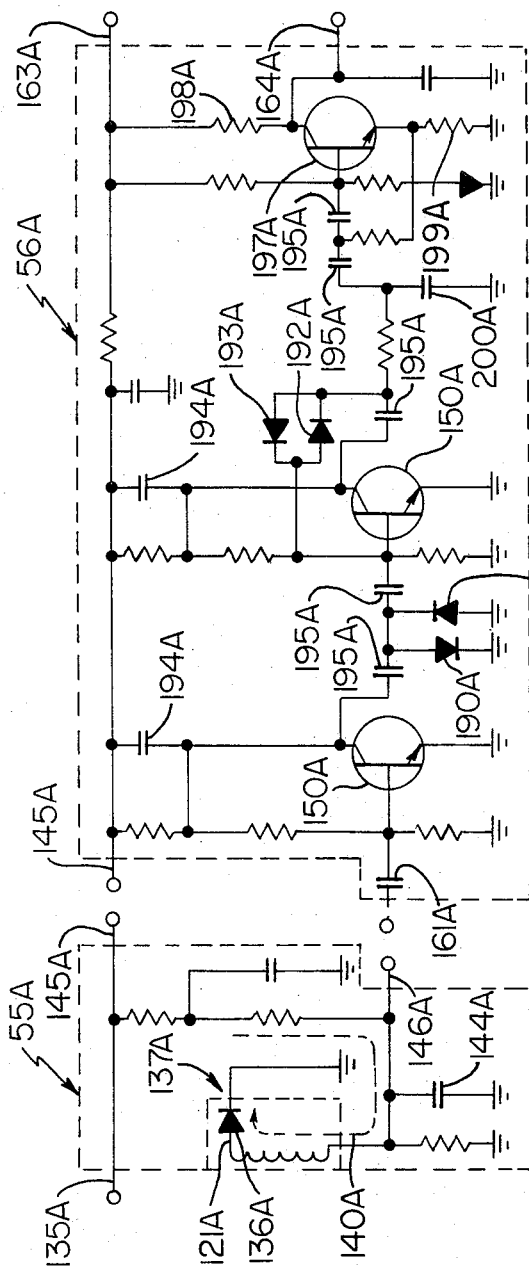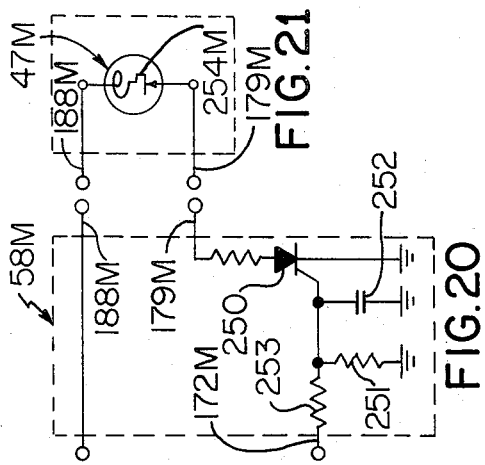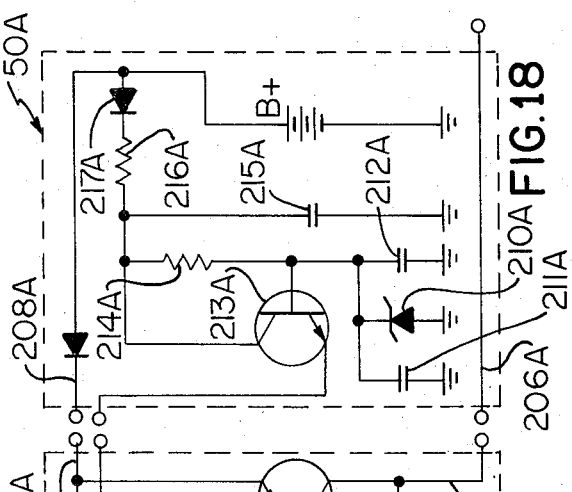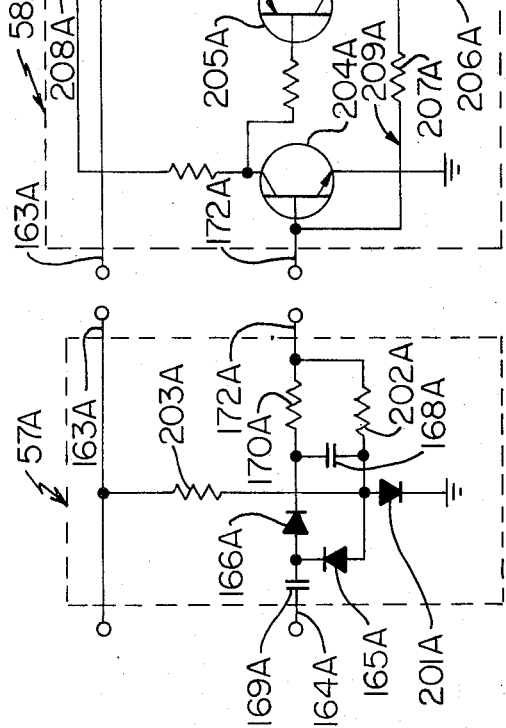

3,810,090

PNEUMATIC TIRE LOW PRESSURE MONITORING AND WARNING SYSTEM

BACKGROUND OF THE INVENTION

Safe, efficient, and economical transportation by motor vehicle carried on pneumatic tires depends in large measure upon maintaining correct pneumatic pressure in all tires of each associated vehicle. In addition, in a vehicle which utilizes power steering, it is more difficult for the vehicle operator to sense a partially deflated tire. However, it is well known that failure to maintain the correct air pressure in each tire may result in excessive tire wear, blowouts, poor fuel mileage, and steering difficulties.

Numerous pneumatic tire low pressure monitoring and warning systems have been proposed heretofore; however, these systems are either too complicated and hence expensive for universal useage in a motor vehicle, incapable of providing a reliable warning signal, impractical, or are not capable of being used over extended periods without requiring excessive maintenance and repair.

SUMMARY

This invention provides an improved pneumatic tire low pressure monitoring and a warning system, of simple and economical construction, which employs a minimum number of component parts and is capable of providing reliable indications over extended periods of time under severe environmental conditions likely to be encountered by an associated vehicle employing such system.

In particular, the system utilizes means sensing a low pressure condition in each pneumatic tire supported on an associated vehicle by its rotatable support and a transmitter fixed to each support and being rotatable therewith and actuated by its associated sensing means to provide pulse modulated output signals with known characteristics at a radio frequency in response to the low pressure condition. A receiving antenna is attached at a fixed position on the vehicle adjacent each tire and each antenna may receive useable output signals only during a portion of each complete rotation of an associated transmitter as provided by its tire. A receiver is employed and means is employed connecting each receiving antenna to the receiver and such receiver is operatively connected to associated indicating means. The receiver may have means for increasing the effective time duration of the useable portions or ones of the output signals to thereby assure that the indicating means is actuated in response to a low pressure condition. The receiver is further arranged to reject the effects of atmospheric and man-made spurious signals while responding reliably to authentic warning signals.

Other details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view illustrating an exemplary motor vehicle utilizing one embodiment of the pneumatic tire low pressure monitoring and warning system of this invention;

FIG. 2 is a schematic presentation of the exemplary system utilized in the vehicle of FIG. 1 wherein such system includes means sensing a low pressure condition in each pneumatic tire of the vehicle, a transmitter associated with each tire and actuated by its sensing means to provide pulsed output signals at a radio frequency, a receiving antenna operatively associated with each transmitter, a receiver operatively connected to each receiving antenna for receiving the signals from the transmitters, and an indicator for providing an indication in the event of a low pressure condition in one or more tires;

FIG. 2A is a fragmentary view of a typical assembly comprised of a sensor, transmitter, and battery mounted on the hub of one of the tires of the vehicle of FIG. 1;

FIG. 2B is a schematic diagram highlighting that each receiving antenna receives a useable signal only during an angular portion of each rotation of its associated transmitter;

FIG. 3 is a view with parts shown in elevation, parts in cross section, and other parts shown schematically of a typical exemplary sensor and its battery comprising the system of FIG. 2;

FIG. 4 is a schematic electrical circuit diagram of a typical exemplary transmitter comprising the system of FIG. 2;

FIG. 5 is a schematic electrical circuit diagram of a typical exemplary receiving antenna comprising the system of FIG. 2;

FIG. 6 is a schematic showing of the exemplary summer provided in the system of FIG. 2.

FIG. 7 illustrates a schematic electrical circuit diagram of an exemplary radio frequency amplifier comprising the receiver of FIG. 2;

FIG. 8 illustrates a schematic electrical circuit diagram of an exemplary detector comprising the receiver of FIG. 2;

FIG. 9 is a schematic electrical circuit diagram of an exemplary low frequency amplifier, limiter, and filter comprising the receiver of FIG. 2;

FIG. 10 is a schematic electrical circuit diagram illustrating an exemplary rectifier-integrator comprising the receiver of FIG. 2;

FIG. 11 is a schematic electrical circuit diagram of an exemplary so-called pulse stretcher and indicator control comprising the receiver of FIG. 2;

FIG. 12 is a schematic electrical circuit diagram of an exemplary electrical power supply for the receiver of FIG. 2;

FIG. 13 is a schematic electrical circuit diagram of the indicator of FIG. 2;

FIGS. 14, 15, 16, 17, and 18 illustrate schematic electrical circuit diagrams of other embodiments of cooperating electrical circuits comprising a detector; low frequency amplifier, limiter, and filter; rectifier-integrator; pulse stretcher and indicator control; and power supply which may be substituted for similar corresponding circuits in the receiver of FIG. 2;

FIG. 19 illustrates a schematic electrical diagram of another exemplary embodiment of a low frequency amplifier, limiter, and filter which may be used substantially interchangeably with circuitry illustrated in FIGS. 9 and 15; and FIGS. 20 and 21 illustrate schematic electrical circuit diagrams of a pulse stretcher and indicator control together with an associated indicator which may be interchanged with their corresponding circuits in the receiver of FIG. 2.

DESCRIPTION OF THE OVERALL SYSTEM

Reference is now made to FIG. 1 of the drawings which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying as associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 30 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of a passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed on the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41, also see FIG. 3, and the sensor 37, transmitter 40, and battery 41 of each particular wheel assemly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37, see FIG. 3, is comprised of a sealed pressurized hemispherical dome which dimples in a substantial predetermined manner when it is exposed to an external pressure greater than a predetermined minimum. The dimple action serves as a normally open electrical snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as oscillator 40, is actuated by the snap action of its sensor 37 whereby the associated battery 41 provides electrical power for the oscillator 40. The oscillator 40 is a self-pulsed oscillator which generates a radio frequency (RF) signal with distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as electrical apparatus of the vehicle 30 is minimized. Further, because transmission basically may be considered as the coupling between a stationary coil on a receiving antenna 43 and a rotating coil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the differences in shielding interposed between the coils at different relative positions thereof. As a result of these factors the transmitted output signal from the transmitter 40 is of sufficient strength to be useable only during a portion of each revolution or rotation of its wheel assembly 32. Stated in another manner, because each receiving antenna 43 is attached at a fixed position on the vehicle adjacent its wheel assembly 32, the antenna 43 receives a useable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was selected. The system 36 utilizes a receiver 45 which is operatively connected to each receiving antenna 43 by an associated coaxial cable 46 and the receiver employs unique means for increasing the effective time duration of the useable portions of the output signals from the transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 in addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially; however, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pulse repetition rate will result in a flickering action by the lamp 47. If the vehicle 30 is moving at higher speeds the lamp 47 may be turned ON for a time period which is insufficient to insure full brightness.

This performance of the lamp at higher vehicle speeds in combination with the higher pulse repetition rate due to faster rotation reduces the flickering; however, the total perceptible light may be inadequate to be used as an indicator.

To highlight this situation reference is made to FIG. 2B of the drawings wherein it is seen that for each full rotation of a wheel the transmission level is high enough to activate or light the indicator lamp 47, for X degrees while such lamp is dark for the remaining (360–X) degrees. By way of an example, X may be 30°, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator ON time or the time that it is activated is increased relative to its OFF time. In particular, the performance of the indicator 47 may be substantially improved if the effective time duration of a useable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including; power supply disturbances generated by the electrical equipment of the vehicle 30, including the starter, horn, window washer, windshield wipers, key alarms, etc.; RF signals generated by natural atmospheric electrical disturbances such as static; RF signals generated by the above-mentioned electrical equipment of the vehicle 30; RF signals generated by electrical equipment external to the vehicle; voice-modulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all the following characteristics of being in the selected RF band, being an RF signal which is pulsating at the predetermined frequency defined by the self-pulsed oscillator, and being an RF signal which is pulsating at a rate and with a pulse width determined by the angle X of rotation over which a recognizable signal is received in combination with the rotational velocity of an associated wheel assembly 32 of the vehicle 30.

The receiver 45 has an RF pass band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. The circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will insure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of useable ones of the output signals provided to RF receiver 45 by receiving antennas 43 and insures that a satisfactory indicator signal is provided to the indicator 47 to present a distinct indication. The pulse stretcher 58 is inherently a regenerative device whereby it also increases the sensitivity of the RF receiver since any signal which is capable of activating the pulse stretcher will provide a saturated output signal. The circuit 58 activates indicator 47 to warn the operator of the vehicle 30 in the event of a low pressure condition in any one of the vehicle tires. The receiver 45 also has suitable means in its power supply 51 for filtering such power supply to reduce power supply line disturbances to a tolerable level.

Having described the general operation of the system 36 of this invention in connection with the exemplary vehicle 30, a detailed description will now be presented by the various components comprising such system.

SENSOR 37

Reference is now made to FIG. 3 of the drawings which illustrates one exemplary embodiment of the improved sensor which will also be referred to as a tire deflation pressure switch 37. As indicated earlier a switch 37 is provided for each wheel assembly 32 and the following description of one switch is fully applicable to all pressure switches in the system.

The pressure switch is mounted to the tire rim or hub 33 and when the tubular tire 34 is mounted on the rim the switch 37 is in communication with the internal pressure of the tire. The switch 37 is comprised of a thin shell dome-shaped or roughly hemispherical diaphragm 62. The diaphragm 62 is hermetically sealed by known methods at 63 to a rigid shell or shell member 64. The shell 64 may extend within the area of the diaphragm 62 as shown; however, the shell may also be a flat plate. The diaphragm 62 and shell 64 cooperate to define an enclosed or sealed fluid chamber 66.

The pressure switch 37 is formed by using the dome diaphragm 62 as one electrical contact, a terminal 68 being secured to the peripheral lip 70 of the diaphragm 62, and a bridge 72 forming the other contact with a terminal 74 being secured to the bridge 72. The diaphragm 62 and shell 64 are electrically separated from the bridge 72 by respectively mounting the parts on any suitable insulating pad 76. A contact 78 is secured to the bridge 72 so as to be in physical contact with the dome diaphragm 62 under a given condition such as under inflation or deflation of the tire, as will be explained herebelow.

It is known that for the case of a thin-walled spherical shell that a buckle may develop if the shell is exposed to a pressure above a certain level. However, if the stress of the material is held within its elastic limits, the buckling wave is restricted to a small dimple subtended by a solid angle of about 16°. In addition, when a segment of a spherical shell is loaded by external pressure, experiments have shown that only one single small buckle appears, located in this segment, whereas the rest of the shell remains in approximately spherical shape. These phenomena are discussed in the *Journal of Aeronautical Sciences*, in articles appearing in Vol. 7, December 1939, No. 2, pages 43–50, and August 1942, pages 373–384.

Accordingly, the rigid shell 64 is so shaped, including a flat shape, within the dome diaphragm 62 that the horizontal portion provides a limit or stop for the buckling of the diaphragm 62, herein shown by the dotted line portion in FIG. 3. The limiting of the deformation or buckling of the diaphragm 62 is such that the angle of the small dimple is approximately 16° and well within the elastic limit of the diaphragm material. To insure that the dimple or buckling of the diaphragm 62 occurs in the correct location, the contact 78 provides a prestress force to the dome diaphragm 62 and hence produces an initial small dimple 79 therein. The amount of prestressing of the diaphragm 62 may be changed by raising or lowering the bridge 72. This prestressing or preloading may also be used as a convenient and efficient means to establish the pressure at which the buckling takes place.

In operation, the pressure switch is installed to the hub or rim of the wheel within the tire. In the deflated condition the pressure switch remains in the solid line position illustrated. As the tire is inflated, the switch 37 will remain in the solid line position until the pressure within the tire exceeds the established pressure for buckling. At this point, the dome diaphragm 62 buckles to the dotted line position shown in FIG. 3 and the switch is placed in the open condition. When the pressure in the tire is reduced to below the buckling pressure, the elasticity of the material in the dome diaphragm 62 returns the diaphragm 62 to its initial position wherein such diaphragm makes contact with the contact 78 thereby closing the switch.

The terminals 68 and 74 are connected by electrical lines 80 and 81 to the transmitter 40 and electrical power for such transmitter is provided by the battery 41. A detailed description of the transmitter 40 will be presented subsequently.

Thus, it can be seen that the pressure switch hereinabove described has no moving parts yet an efficient switching action in response to air pressure in its associated tire 34 is provided by a substantial dimpling or buckling effect. By holding the deformation of the dome diaphragm 62 to a small dimple or buckling, the elastic limit is not exceeded, thereby assuring repeatability of such buckling or dimpling effect and the resulting switching.

The material thickness of the dome diaphragm 62 may also be used to control the operational pressure at which buckling will occur. Thus, if the thickness of the dome diaphragm is increased, it will require a greater tire pressure to cause the buckling.

TRANSMITTER 40

The transmitter 40 which will also be referred to as oscillator 40, see FIG. 4, is energized by its sensor 37 and powered by its battery 41 to operate whenever the pressure within its associated tire 34 falls below a preselected value. To eliminate or effectively minimize the number of false alarms it is desirable that the oscillator signal be coded to insure its positive recognition and a simple and unique method which may be used to code the signal employs pulse modulation of the oscillator output. The transmitter or oscillator 40 is electrically connected to the sensor 37 by electrical lines 80 and 81 and the oscillator is separated from its battery 41 by the RF filter defined by coil 83 and capacitor 84.

The oscillator 40 provides optimum circuit simplicity and low cost inasmuch as it employs oscillating means having only one active circuit which includes a coil 86 and capacitors 85, 87 and 90. An analysis of the oscillator circuit will reveal that the utilization of the capacitor 85 causes coil 86 in series therewith to provide a series resonance which will exhibit a capacitive reactance below and an inductive reactance above the tuning frequency. Consequently, the capacitive impedance comprising capacitors 87 and 90 will resonate with the combination of coil 86 and capacitor 85 above the tuning frequency of the combination of components 85 and 86. However, assuming capacitor 85 is small compared to capacitors 87 and 90 then the tuning frequency will be determined almost exclusively by the characteristics of the coil 86 and capacitor 85 and the capacitors 87 and 90 will in essence overpower the characteristics of the transistor 91 connected in the circuit.

The voltages associated with transistor 91 are determined by the fact that the collector electrode or collector 92 of such transistor is connected directly to the power supply or battery 41 through lead 81, the base electrode or base 93 of such transistor is connected to a voltage divider network comprised of resistors 94-95 and diode 96. The diode 96 operates in the circuit to provide a voltage variable impedance which will insure operation at lower voltage levels than otherwise feasible. The emitter electrode or emitter 97 of transistor 91 is connected to ground through a parallel resistor-capacitor network comprised of capacitor 100 and resistor 101.

Regenerative feedback for the oscillator 40 circuit is similar to such feedback in the Colpitts oscillator and hence will not be discussed further because the Colpitts circuit is generally well known.

To understand the pulsed operation of oscillator 40 assume that the voltage across the capacitor-resistor combination 100-101 is so high that there is no regenerative or feedback action whereby under this condition the oscillator cannot oscillate. However, if the charge on the capacitor 100 is permitted to leak off through the resistor 101, then oscillation will commence once the capacitor 100 reaches a given voltage. This oscillation will increase current flow through the emitter 97 and the voltage across the capacitor 100 will increase and may, with proper circuit constants, continue to increase until the oscillations stop and the above cycle of operation is repeated.

Thus, it is seen that the circuit for the transmitter or oscillator 40 is such that a self-pulsed transistor-oscillator is provided and the self-pulsing action is assured by selecting a value for the capacitor 100 which is far greater than required to effect an adequate RF bypass, selecting the time constant for the capacitor 100 and resistor 101 combination so that it is commensurate with the desired pulse repetition rate, and finally deliberately selecting a poor capacitor 100 or one that has a substantially poor dissipation factor, i.e., greater than 0.1 percent. This requirement of having a poor capacitor results not only in a reduction of the circuit cost but also provides the unique self-pulsed oscillator for the system 36.

The emitter voltage which will start the oscillation is considerably lower than that required to stop oscillation. This well known hysteresis effect results from the dynamic alternating voltages existing on an oscillating transistor and during part of the cycle the alternating voltages will produce sufficient regeneration to sustain the oscillation even though the DC voltages by themselves are unable to do so.

The oscillator 40 in this example is tuned to oscillate within a radio frequency band which may be the citizen's radio band from 26.97 to 27.27 mc operating with a repetition rate which may be 40 kc plus or minus 15 kc. The battery 41 used to power the oscillator 40 is preferably a mercury cadmium battery of known construction.

RECEIVING ANTENNA 43

The electrical circuit diagram for the receiving antenna 43 is illustrated in FIG. 5 of the drawings and as will be apparent from FIG. 1 each receiving antenna 43 is mounted to the chassis of the vehicle 30 at a fixed location or position with the location being selected to assure optimum reception from its associated oscillator or transmitter 40. In particular, the coupling between the oscillating coil of each transmitter 40 and the coil of its associated receiving antenna will be maximized with due consideration given to accessibility and wiring requirements. Normally, each receiving antenna 43 will be in a wheel well of the vehicle 30 and each antenna 43 is preferably potted with a suitable potting compound after assembly to enable the antenna to withstand shock and vibration. In addition, the potting compound is preferably moisture impervious to assure reliable operation of the antenna under extreme enviromental conditions.

To maximize signal pickup yet minimize its physical size, the antenna 43 uses a relatively sharply tuned coil 105 encircling a ferrite rod 102. The resistive loss in coil 105 is shown as a resistor 103; and, a tuning capacitor 104 and a coupling capacitor 107 are connected in parallel with coil 105. The coil 105 is evenly distributed over the length of the ferrite rod 102 to assure maximum signal pickup and the coil spacing is used to tune the antenna thereby avoiding costly and usually unreliable variable trimmer capacitors. The antenna 43 is tuned prior to potting and mounting on the associated vehicle 30 and a frequency offset is provided to allow for anticipated frequency shifts.

Each receiving antenna 43 is operatively connected to the receiver 45 through its grounded coaxial cable 46 having a grounded shield 111 and inner lead 112.

RECEIVER 45

The receiver 45 from the system 36 is designed for mounting to the chassis of the vehicle 30 at any suitable location. The receiver employs circuitry which may be easily assembled on a printed circuit board carried within a compact case and the circuit board is arranged to permit insertion of component parts by automatic assembly machines for production thereof in large quantities. The various component parts of the exemplary receiver 45 will now be described in detail.

SUMMER 53

The summer 53 is illustrated schematically in FIG. 6 of the drawings and amounts to a summing junction 113 for the coaxial electrical leads 112 from all receiving antennas 43 with the shields being grounded as shown at 114. Ordinarily there is a loss in gain from this arrangement; however, such loss is readily overcome by subsequent amplifier gain in the remainder of the receiver circuit inasmuch as the thermal noise level is low compared to the signal level. In addition, the standing waves using the receiving antennae 43 are acceptable. It will be appreciated that the ideal summing system would require four parallel amplifier stages followed by summing circuitry; however, it has been found that with the system 36 such ideal summing system is not necessary whereby its added cost is avoided. The signals from the summer 53 and in particular summing junction 113 are provided to the RF amplifier 54 through an electrical lead 115.

RF AMPLIFIER 54

As seen in FIG. 7, the signals from the four receiving antennas 43 are fed through lead 115 and capacitively coupled to the base 116 of a first transistor 117 comprising the RF amplifier 54 and it will be seen that the amplifier 54 also employs a second transistor, also designated 117, which is preferably identical to the first transistor. The transistors 117 are coupled by a pair of RF transformers each designated by the reference numeral 120 having slug-tuned primaries 121 and untuned secondaries 122. The coupling between the first RF transformer 120 and the base of the second transistor 117 is controlled by a series connected resistor 118 and capacitor 119. The voltage supply for the collector 123 of each transistor 117 is separately filtered by a filter comprised in each instance of a pair of capacitors 125 and 126 and a resistor 127. In addition, the signals provided to amplifier 54 through line or lead 115 are coupled by a capacitor 130 and resistors 131 and 132 connected to the base 116 of the first transistor 117. Power to the RF amplifier 54 is supplied through a lead 135.

DETECTOR 55

The RF amplifier 54 is coupled to the detector 55 by the RF transformer 120 and it will be seen from FIG. 8 that the detector is a conventional diode detector 136 located inside the shield of the second RF transformer 120 of amplifier 54 as illustrated at 137. The diode detector 136 is forward biased as indicated by the dotted path 140 thereby facilitating its ability to perform at very low signal levels and the forward biasing of the diode 136 is assured by provision of resistors 141, 142 and 143. The output from the detector 55 is provided to the LF amplifier, limiter, and filter 56 through electrical lead 146 and ground. Power to the detector 55 is supplied through a lead 145.

LF AMPLIFIER, LIMITER AND FILTER 56

As seen in FIG. 9 of the drawings, the LF (low frequency including audio frequencies) amplifier, limiter and filter circuit 56 is operatively connected to the detector 55 by lead 146, as previously mentioned, and the electrical circuit 56 utilizes two stages of amplification each using a transistor or amplifier 150 preferably of the type which may employ the well-known Darlington circuit which is characterized by a high-gain and a high-input impedance. The LF signal in the detector output and the collector circuit of the first amplifier 150 of circuit 56 are amplitude-limited by diode 151 (see FIG. 8) and diode 152. The diode 151 is shunted across the detector output 146. The diode 152 is shunted across the collector tank circuit 156 defined by a capacitor 157 and a coil 158.

The LF filter portion of circuit 56 is incorporated entirely within the LF amplifier circuitry. The collector load of the second LF amplifier 150 comprises an inductance or coil 160 which provides a low frequency cut-off. A coupling capacitor 161 is provided from the detector 55 to the first LF amplifier 150 and a coupling capacitor 152 is provided between the first and second amplifiers 150. The value of capacitors 161 and 162 is held at a minimum compatible with the required LF pass band. The combined action of the low pass and high pass filters serves to generate the desired band pass characteristics, which in combination with the limiters serves to restrict the frequencies which can provide an indication. The circuit 56 is connected by lead 164 and ground to the rectifier-integrator 57. Power to the LF amplifier, limiter, and filter circuit 56 is supplied through lead 163.

RECTIFIER-INTEGRATOR 57

The circuit diagram for the rectifier-integrator is illustrated in FIG. 10 of the drawings and is comprised of a push-pull dual rectifier (serving as a voltage doubler) defined by diodes or rectifiers 165 and 166 with the usual load resistor 167 being connected downstream of the rectifier 166. The rectifier 166 serves as an integrator because it employs a comparatively large size capacitor 168 (10 microfarad, for example) which is charged through a comparatively small (generally of the order of 0.01 microfarad) capacitor 169. The circuit 57 uses a resistor 170 and a capacitor 171 as a resistive-capacitive (RC) filter. The rectifier-integrator 57 is connected to the pulse stretcher and indicator control circuit 58 by electrical lead 172 and ground.

PULSE STRETCHER AND INDICATOR CONTROL 58

The pulse stretcher and indicator control circuit 58 is illustrated in FIG. 11 of the drawings and may be considered a DC and LF amplifier stage. However, a transistor has been added to perform what will be referred to as the so-called "pulse-stretching function." The circuit 58 utilizes a power transistor 173 which is normally OFF and what will be referred to as a control transistor 174 which is normally ON. Under conditions where the rectifier-integrator circuit 57 and in particular the capacitor 168 of such circuit provides a positive output voltage through line 172 which is of sufficient level to turn the power transistor 173 ON, this will cause the voltage across its collector 175 to drop.

As previously indicated the control transistor 174 is biased to be normally ON; however, when the power transistor 173 is turned ON a negative pulse is fed to the base of the control transistor 174 and will turn it OFF. The increased control transistor collector voltage will feed base current to the power transistor 173 through diode 178D and resistor 178R and maintain it in an ON condition. However, a coupling capacitor 177 is provided and will proceed to discharge so that when capacitor 177 is discharged the control transistor 174 will turn ON and thereby turn the power transistor 173 OFF. As a result, all signals or pulses, regardless of their initial length or time duration, will be stretched by the action of the coupling capacitor 177 to a predetermined time duration which in one application of the system of this invention were stretched to approximately 40 milliseconds.

The above-described increased time duration assures that the indicator 47 operatively connected to circuit 58 is positively activated in response to a low pressure condition in any one of the tires monitored by the system 36. Further, because of the operating characteristics of transistor 173 it will only be activated by a voltage level which is sufficiently high that only a low pressure condition in a tire could cause such a voltage level and not some other condition, due to the combined action of the band-pass and limiter characteristic of the LF amplifier, limiter, and filter 56.

The indicator 47 is controlled by the power transistor 173 and such indicator, shown in FIG. 13, is in the form of a lamp which will also be referred to as lamp 47 and in a manner to be described subsequently. The circuit 58 is connected to the power supply 50 by leads 179 and 180 and ground.

POWER SUPPLY 50

As illustrated in FIG. 12 of the drawings the power supply circuit 50 comprises the battery of the vehicle 30 which will be designated B+ and provides a voltage generally of the order of +15 volts. The circuit 50 also includes means for providing a 9 volt regulated supply and such means is defined by a Zener diode 182 which provides the voltage regulation function and has an RC filter defined by capacitors 183, 184 and 185 and resistors 186 and 187. The 9 volt potential is supplied to all portions of the receiver 45 through lead 180; however, one side of the lamp 147 is connected directly to the B+ 15 volt supply by a load 188.

The other side of lamp 47 is connected by lead 179 to circuit 58. In particular, it will be seen that lamp 47 is connected to the collector 175 of power transistor 173 whereby transistor 173 serves to turn the lamp 47 ON and OFF with the ON time being stretched by the cooperating action of capacitor 177 and transistor 174, combined with the feed back circuit diode 178D and resistor 178R.

MODIFIED RECEIVER 45

Various component circuits of the receiver 45 may be suitably modified and utilized in such receiver substantially interchangeably therewith as will now be described. For convenience and ease of presentation these modified component circuits will be given the same general reference numeral designation as similar previously described circuits followed by the letter designation "A" and such circuits are illustrated in FIGS. 14, 15, 16, 17 and 18 and will be designated circuits 55A, 56A, 57A, 58A and 50A respectively. Further, certain component portions of each circuit 50A and 55A–58A which are similar to corresponding portions of the circuits 50 and 55–58 will in each instance be given the same reference numeral designation also followed by the letter designation A and not described in detail. Only those component portions of the modified circuits which are substantially different or comprise added basic components will be given a new reference numeral also followed by the letter designation A and described in detail.

The modified receiver 45 is particularly adapted to receive coaxial inputs from more than four receiving antennas into its summer and such modified receiver utilizes a so-called "active" filter in its LF amplifier, limiter, and filter circuit 56A as will appear hereinafter. In addition, the RF amplifier for the modified receiver 45 is basically the same as the amplifier 54 with minor rearrangement of components to assure less interstage coupling while providing a better B+ filter and these modifications may be achieved using any suitable technique known in the art. It is also desired that components 50A and 55A–58A be used together as cooperating circuits and with indicator 47 plus circuits 53 and 54 modified as mentioned above; however, it will be appreciated that each of these modified circuits may with minor modifications, be used interchangeably with its corresponding circuit of the receiver 45.

DETECTOR 55A

The detector 55A is shown in FIG. 14 and has a detector load capacitor 144A which has been decreased substantially in size to reduce cutoff distortion. In addition, the so-called B+ bleeder circuit through lead 145A has been slightly rearranged to obtain better B+ filtering. The detector 55A is connected to the LF amplifier, limiter, and filter circuit 56A by lead 146A and ground. Power to the detector 55A is supplied through lead 145A.

LF AMPLIFIER, LIMITER, AND FILTER 56A

The LF amplifier, limiter, and filter circuit 56A is shown in FIG. 15 and has, by way of example, two stages of amplification employing transistors or amplifiers 150A and limiting circuitry which has been strengthened substantially by two diodes 190A and 191A parallel connected in opposition as a variable load between the LF amplifiers 150A. With this circuit configuration the known diode characteristics will produce a resistive impedance which is far greater for small positive and negative voltages than for greater values. Accordingly, when this diode configuration is inserted as a shunt element in a coupling link it will effectively limit positive and negative voltage excursions and thereby limit the signal amplitude as required. In addition, two diodes 192A and 193A have been parallel connected in opposition and connected as a degenerative feed-back path in the circuit between the collector and base of the second amplifier 150A. When used in this circuit the high impedance of the diode configuration will effectively eliminate degeneration for small negative and positive voltages. However, the degeneration and therefore the limiting action becomes much more effective at greater voltage excursions.

The collector load resistances of both LF amplifier stages or transistors 150A are capacitance-loaded by capacitors 194A to minimize the frequency response beyond or above the frequency band of the transmitter 40. The circuit 56A also has a plurality of coupling capacitors 195A in addition to coupling capacitors 161A and the values of coupling capacitors comprised of capacitors 161A and 195A are held to a minimum to reduce the LF response below the pulse frequency band of the transmitter 40.

The circuit 56A has a third LF amplifier stage utilizing a transistor or amplifier 197A which also serves as a high-pass active filter. The transistor 197A supplements the filtering of high frequencies provided by the joint action of capacitors 194A and a gounded capacitor 200A connected to the base of the transistor 197A. The associated circuit for transistor 197A provides a resistance in the form of resistor 198A in the circuit from the collector of amplifier 197A and a resistor 199A between its emitter and ground thereby enabling the amplifier 197A to provide both amplification and a high-pass filtering action. The added limiting and filtering of circuit 56A results in a better defined LF passband. The circuit 56A is connected to its associated rectifier-integrator circuit 57A by lead 164A and ground, with power to the circuit 56A being supplied through lead 163A.

RECTIFIER-INTEGRATOR 57A

The rectifier-integrator circuit 57A is illustrated in FIG. 16 and also utilizes a push-pull rectifier circuit defined by rectifiers 165A, 166A, and an added rectifier 201A. The selection of capacitors 168A and 169A together with added resistors 202A and 203A is such that the effective integration time for the output signals received from the transmitter though substantially increased over the pulse repetition interval is shorter than the integration time for the signals provided from the rectifier-integrator circuit 57. The rectifier-integrator circuit 57A is operatively connected to the pulse stretcher and indicator control circuit 58A by lead 172A and ground. Power to the rectifier-integrator circuit 57A is supplied through lead 163A.

PULSE STRETCHER AND INDICATOR CONTROL 58A

The pulse stretcher and indicator control apparatus or circuit 58A (see FIG. 17) provides stretching of each incoming pulse or signal from the transmitter by utilizing an amplifier in the form of an NPN transistor 204A having the usual, base, collector and emitter electrodes and a cooperating PNP transistor 205A also having base, collector, and emitter electrodes. A positive input signal will charge the capacitor 168A of FIG. 16 through rectifying diodes 166A to a positive level which will suffice to turn transistor 204A ON and lower its collector voltage to the value approaching ground potential thereby turning transistor 205A ON and supplying substantially full B+ voltage upwards of plus 15 volts through lead 206A which is supplied to one terminal of the indicator 47 of receiver 45 while the other terminal of the indicator 47 is connected to ground. The transistor will remain ON until the charge on the storage capacitor has diminished to an extent where the voltage across the capacitor is insufficient to maintain transistor 204A.

The circuit 58A also has a positive feedback loop 209A operatively connected between the collector of transistor 205A and the base of transistor 204A and such loop 209A includes a resistor 207A. However, assume that resistor 207A is eliminated, the circuitry will in essence be a two stage amplifier and its turn OFF will be determined by the time constant established by the capacitor 168A and its associated resistive circuitry which may be of the order of approximately 100 milliseconds. By adding the resistor 207A the circuit 58A operates as an undercompensated switching amplifier, i.e., feedback current through the resistor 207A by itself is insufficient to maintain the associated indicator of receiver 45 in an ON condition and it must therefore be supplemented with input pulses.

In this example of receiver 45 the indicator 47 is in the form of a lamp and as the voltage across the lamp increases, the positive feedback through the resistor 207A adds to the input signal and provides a switching action. This will serve to turn the indicator lamp 47 fully ON even if the input signal is insufficient to accomplish this. Additionally, the positive feedback generates a hysteresis effect on the input switching levels since it takes less input signal to hold the lamp ON than it does to turn it ON initially. Thus, it is seen that the incoming pulse is stretched for three reasons, hysteresis effect due to positive feedback through loop 209A, time delay in base voltage leak-off or reduction in potential of said base of transistor 205A, and an additional time delay in leak-off resulting from positive feedback through loop 209A whereby the overall effect is to increase the time delay to approximately 150 milliseconds. The circuit 58A is connected to the indicator 47 by the lead 206A previously mentioned and power for circuit 58A is supplied by a lead 208A.

POWER SUPPLY

The power supply circuit 50A is illustrated in FIG. 18 of the drawings and employs a voltage regulator circuit comprised of a Zener diode 210A connected in parallel with an RF bypass capacitor 211A and an LF bypass capacitor 212A and this parallel combination is connected between the base of a transistor 213A and ground. A bleeder resistor 214A provided between the collector of transistor 213A and its base assures that the base is maintained at the selected Zener voltage which may be of the order of 9.1 volts for the receiver 45. The emitter electrode or emitter of transistor 213A may be connected to a portion (such as the rectifier-integrator) of the receiver 45 by a lead 219A.

The characteristics of the transistor 213A are such that the minimum output voltage will be held constant at a voltage slightly lower than 9.1 volts, and the capacitance loading across the Zener diode will constitute an effective capacitance load across the output equal to the actual capacitance value multiplied by the amplification factor of the transistor 213A. Voltage variation and voltage ripple on output lead 219A will be minimized or eliminated due in part to the voltage regulation performed by the transistor 213A and due in part to the large effective capacity across the output. However, it is evident that the transistor cannot function if the collector voltage drops below the base and that in consequence the voltage regulation ceases.

It has been found that the battery power supply in a motor vehicle (such as passenger automobile, truck, bus, etc.) exhibits substantial voltage drops for short periods reaching almost zero voltage under certain vehicle operating conditions whereby such disturbances will normally be reflected directly into the regulated voltage. However, these performance deficiencies are minimized or substantially eliminated by placing a diode 217A, as a conductor, in the lead between the primary power supply or B+ and the regulated power supply shunted by a capacitor 215A. In the vent of sudden voltage drops in the primary voltage or B+ supply, the voltage across the diode will be reversed whereby current flow through the diode will cease and the requirements of the regulated power supply will be furnished by the storage capacitor 215A. Therefore, it is seen that with this simple addition of diode 217A and capacitor 215A together with the current limiting resistor 216A, if desired, drastic voltage drops are substantially eliminated and the requirements of the regulated power supply are furnished by the storage capacitor 215A. The power supply 50A is also connected to the pulse stretcher, indicator control 58A and to one side of its associated indicator 47 by the lead 208A previously mentioned while the other side of indicator 47 is connected to ground.

MODIFIED LF AMPLIFIER LIMITER AND FILTER CIRCUIT 56M

The receiver 45 of system 36 instead of employing circuit 56 or 56A may be provided with another circuit, see FIG. 19, designated generally by the reference numeral 56M and may be used, with minor modifications of adjoining circuits, in lieu of either of these two circuits 56 or 56A. The circuit 56M utilizes suitably located signal limiters combined with high and low frequency filters to restrict the frequency band within which the LF signals are capable of the indicator 47. The circuit 56M utilizes an active filtering action designed to provide a low frequency cutoff normally referred to as a "knee" at approximately 28 KC. In addition, all coupling capacitors have been made marginal in capacitance value to obtain a maximum of low frequency attenuation, as will be apparent hereinafter.

The circuit 56M, by way of an example, utilizes a plurality of three amplifier stages in the form of three transistors or amplifiers each designated by the reference numeral 220. The amplifier 220 have their collector or output electrode circuits loaded by capacitors in the form of capacitors 221. Each capacitor 221 is connected between the collector or output electrode of its associated transistor or amplifier and ground and the capacitors 221 attenuate or block out frequency response which is beyond or higher than the operational frequency range of the input pulses. The cooperating arrangement of components associated with the amplifiers 220 is such that the gain of the last amplifier 220 is about half the gain of the first amplifier 220 in the circuit.

The circuit 56M employs a plurality of coupling capacitors each designated by the reference numeral 222 which serve to attenuate or block out the low frequency signals. A capacitor 222 is connected upstream of the base of each amplifier 220 while another capacitor 222 is connected to the collector of each amplifier 220.

The circuit 56M also employs a pair of diodes 223 and 224 between the first and second amplifiers 220 and another pair of diodes also designated 223 and 224 between the second and third amplifier and each set of diodes 223 and 224 limits the magnitude of the signal to circuit 56M by holding the voltage within a limit determined by the characteristics or properties of the diodes whereby each pair of diodes 223 and 224 protects its downstream amplifier 220 from a signal that is too large.

The circuit 56M also has a bleeder circuit from the collector of the first amplifier 220 to the base of such amplifier and such bleeder circuit is comprised of resistors 225, 226, 230 and 231 decoupled by a capacitor 227. Similarly, the second amplifier 220 has a bleeder feedback circuit from its collector to its base which includes resistors also designated 225, 226, 230 and 231 and a decoupling capacitor 227. It is to be understood that the components 225–227 for each amplifier 220 need not necessarily have the same value.

The circuit 56M also provides a DC bias to each amplifier 220 in the circuit and for the first amplifier 220 such DC bias is provided by resistors 225 and 226 as well as resistors 230 and 231. Similarly, DC bias to the second amplifier 220 is provided by its associated resistors 225 and 226 as well as resistors 230 and 231.

The circuit 56M has a third LF amplifier stage utilizing a third transistor 220, which also serves as an active high pass filter. The active filter is conventional as outlined in "A Practical Method of Designing RC Active Filters," R. P. Sallen and E. L. Key, *IRE Transactions — Circuit Theory*, March 1955. The associated circuit provides a resistor 228 in the circuit from the collector of the third transistor 220 and a resistor 240 between its emitter and ground, thereby enabling the third amplifier or transistor 220 to provide both a high pass filter and amplification. DC bias is provided by resistors 234 and 235.

Thus, it is seen that the circuit 56M provides the desired amplification, limiting and filtering while assuring that a control signal is transmitted only within a closely controlled band and that false alarms, or the like, are substantially eliminated. Circuit 56M may be connected to circuit 55 by lead 146M and ground and to circuit 57 by lead 164M and ground. Power to circuit 56M is supplied by lead 163M.

PULSE STRETCHER AND INDICATOR CONTROL 58M AND ASSOCIATED INDICATOR 47M

In the description presented heretofore circuits 58 and 58A were presented as exemplary circuits which may be used interchangeably, if desired, as a pulse stretcher and indicator control in the receiver 45 to control indicator 47. The following is a presentation of a modified system or circuit which is designated generally by the reference numeral 58M and represents a pulse stretcher and indicator control which may be used in lieu of the previously described circuits 58 and 58A, and such circuit is illustrated in FIG. 20 of the drawings and is used together with an associated indicator 47M shown in FIG. 21.

Because each transmitter 40 is located off center by a distance D from the axis of its wheel assembly 32 each receiving antenna 43 only receives an effective signal through an angular increment of X degrees as explained earlier in connection with FIG. 2B. Accordingly, the receiver 45 activates the indicator for only small time periods whereby it is apparent that the indicator ON time must be increased by pulse stretching, or the like.

The indicator ON time may be easily increased, indeed the indicator may be kept fully ON once activated or energized by employing a well known electrical device such as a silicon controlled rectifier or SCR to control such lamp or indicator. However, the arrangement utilizing an SCR and an ordinary indicator lamp which is lighted merely by providing current flow through its filament is objectionable because an extraneous or short-time false signal may be introduced into the system which would cause such ordinary indicator lamp to become permanently lighted and thereby indicate that one of the tires of system 36 is low in pneumatic pressure. Therefore, the electrical apparatus defined by circuit 56M and indicator 47M may be employed to overcome these problems.

The circuit 58M may be operatively connected to the rectifier-integrator circuit by a lead 172M and comprises an SCR 250 provided with an RC filter defined by resistors 251 and 253 and a capacitor 252. The resistor 253 also serves as a current limiting resistor. The circuit 58M is connected by a lead 179M to one side of the indicator 47M which is in the form of a flasher filament indicator lamp 47M which will be described subsequently. The other side of the lamp 47M is connected to B+ or to the roughly 15 volt supply by a lead 188M.

The lamp 47M is of known construction and operates so that it is extinguished at regular intervals, i.e., current flow through its filament is regularly interrupted whereby by using lamp 47M it is necessary that the control signal to the SCR 250 be repeated in order for such lamp to remain ON and such a repeated signal would be truly representative of a low pressure condition caused by the action of an associated receiving antenna 43 receiving signals during each angular portion X of rotation of the associated wheel assembly.

A typical lamp 47M of this type is manufactured by the Miniature Lamp Department of the General Electric Company, Nela Park, Cleveland, Ohio and described in General Electric Incandescent Bulletin 3-4429. The flasher filament lamp 47M flashes automatically because of integral means therein in the form of a built-in bimetal strip 254M similar to those used in thermostats. When current flows through the lamp filament such filament is heated, giving off light, and the heated filament causes a bimetal strip comprising such filament to bend away from the lead-in wire thereby breaking the circuit and stopping current flow through the filament. As the bimetal strip cools it bends back to its original position and against the lead-in wire to thereby relight the lamp. This cooling and heating cycle provides the flashing action.

In one application of this invention a flasher filament lamp 47M designed to operate on 14 volts and draw a current of 270 milliamperes resulted in the lamp flashing a hundred times per minute. Each ON period thus produced by the cooperating pulse stretching means defined by SCR 250 and lamp 47M is substantially longer than most pulses generated by the system 36 of this invention as a result of a low pressure in a tire. Thus, the disadvantage of having a system which is energized by SCR 250 is eliminated and with flasher filament type lamp 47M a spurious false alarm cannot trigger or activate such lamp except for perhaps one heating cycle of the lamp whereby current flow therethrough is broken and it is necessary for another signal to be provided to the SCR 250. As a practical matter another signal would only be likely to occur by a low pressure warning signal produced by a sensor 37 actuating an associated transmitter 40.

GENERAL COMMENTS

Subject matter disclosed, but not claimed herein, is claimed in various ones of the following copending United States patent applications assigned to the same assignee as the present application and filed in the United States Patent Office on the same day: As to a "Self-Pulsing Transmitter" patent application Docket No. R–96, of John C. Murphy; as to a "Pulse Stretcher for a Receiver of a Pneumatic Tire Low Pressure Monitoring and Warning System," patent application Docket No. R–97, Donald E. Church; as to an "LF Amplifier, Limiter, and Filter System for a Receiver of a Pneumatic Tire Low Pressure Monitoring and Warning System," patent application Serial No. Docket R–98, Charles E. Hill and William R. Brobeck; as to a "Power Supply with Unidirectional Current Flow for a Pneumatic Tire Low Pressure Monitoring and Warning System," patent application Docket No. R–99, Charles E. Hill and William R. Brobeck; and as to a "Pulse Stretcher For a Receiver of a Pneumatic Tire Low Pressure Monitoring and Warning System," patent application Docket No. R–100, Charles E. Hill. In addition, subject matter disclosed but not claimed herein to a "Tire Deflation Pressure Switch" is claimed in copending patent application Ser. No. 237,386 of William R. Brobeck and Buddy F. Lane, filed Mar. 23, 1972.

While present exemplary embodiments of this invention, and methods of practicing the same, have been illustrated and described, it will be recognized that this invention may be otherwise variously embodied and practiced within the scope of the following claims.

What is claimed is:

1. A pneumatic tire low pressure monitoring and warning system comprising, means sensing a low pressure condition in a pneumatic tire supported on an associated vehicle by a rotatable support, a transmitter fixed off center to said rotatable support and being rotatable therewith at a distance from the central axis of rotation, said transmitter being actuated by said sensing means to generate output signals at a radio frequency in response to said low pressure condition, a receiving antenna attached at a fixed position on said vehicle adjacent said tire within the near field of said transmitter, the coupling between said transmitter and said receiving antenna being subject to large variations resulting from differences in distance, orientation and shielding between said transmitter and said receiving antenna, said antenna receiving only usable radio frequency signals during a portion of each complete rotation of said transmitter therepast when said coupling is maximized, a receiver, means operatively connecting said receiving antenna to said receiver, said receiver generating a discontinuous control signal indicating means operatively connected to said receiver and being activated by said control signal, and means in said receiver for increasing the effective time periods of said control signals to exceed the useful time periods of said radio frequency signals, said increasing means assuring said indicating means is effectively activated in response to said low pressure condition.

2. A system as set forth in claim 1 in which said sensing means comprises a pneumatic pressure actuated electrical switch.

3. A system as set forth in claim 1 in which said sensing means comprises a pneumatic pressure actuated switch, said transmitter is in the form of an oscillator tuned to oscillate within a preselected band, and further comprising a battery as a power source for said oscillator.

4. A system as set forth in claim 3 in which said sensing means, oscillator, and battery are provided as an assembly, said assembly being detachable fixed to said rotatable support and thus carried thereby.

5. A system as set forth in claim 1 in which said transmitter comprises a self-pulsed transistor oscillator which provides said output signals as pulse modulated output signals, said pulse modulated signals having a pulse repetition rate within a pulse frequency band, and said receiver comprising an LF amplifier which selectively amplifies pulse signals within said pulse frequency band and attenuates signals outside said pulse frequency band, a rectifier integrating the rectifier pulse thereby generating said control signal.

6. In combination: a vehicle having a plurality of rotatable supports each supporting an associated pneumatic tire and being rotatable about an associated central axis of rotation and a system for detecting the presence of a low pressure condition in any one of the pneumatic tires, said system comprising, means sensing a low pressure condition in each pneumatic tire, a plurality of transmitters each carried off center by an associated rotatable support and being rotatable therewith at a distance from the central axis of rotation, each transmitter being actuated by its associated sensing means to provide pulse modulated output signals at a radio frequency in response to a low pressure condition in its associated tire, said pulse modulated signals having a pulse modulation rate within a preselected pulse frequency band, a plurality of receiving antennas each attached at a fixed position on said vehicle adjacent an associated tire within the near field of each of said transmitters, the couplings between said transmitters and said receiving antennas being subject to large variations resulting from differences in distance, orientation and shielding between said transmitters and said receiving antennas, said receiving antennas only receiving usable radio frequency signals during a portion of each complete rotation of an associated transmitter therepast when said coupling is maximized, a receiver, said receiver comprising an LF amplifier which selectively amplifies pulse signals within said pulse frequency band, a rectifier integrating the rectifier pulse thereby generating a control voltage, means operatively connecting each receiving antenna to said receiver, an indicator operatively connected to said receiver and being activated by said control voltage, and means in said receiver for increasing the effective time periods of said usable control signals to exceed the useful time periods of said radio frequency signals, said increasing means assuring said indicator is effectively activated in response to a low pressure condition in any one of said tires.

7. A combination as set forth in claim 6 in which each transmitter is mounted off center from an axis of rotation of its associated rotatable support thereby providing said useable output signals only during an angular portion of each complete rotation of a support and its transmitter past an associated receiving antenna.

8. A combination as set forth in claim 7 in which each of said transmitters comprises a self-pulsed transistor oscillator.

9. A combination as set forth in claim 7 in which said indicator is in the form of a visual indicator.

10. A combination as set forth in claim 7 in which said means operatively connecting each receiving antenna to said receiver comprises a plurality of cable means each connecting an associated receiving antenna to said receiver.

11. A combination as set forth in claim 6 in which each of said supports comprises a mounting hub supporting an associated tire in the form of a tubeless tire and each of said transmitters is detachable fixed to an associated hub.

12. A combination as set forth in claim 10 in which said LF amplifier has a plurality of cooperating transistor-amplifiers the last of which also serves as a high-pass active filter.

13. A pneumatic tire low pressure monitoring and warning system comprising, means sensing a low pressure condition in a pneumatic tire supported on an associated vehicle by a rotatable support, a transmitter fixed to said rotatable support and being rotatable therewith, said transmitter being actuated by said sensing means and provides pulse modulated output signals at a predetermined radio frequency in response to said low pressure condition, said pulse-modulated signals having a pulse repetition rate within a pulse frequency band, a receiving antenna attached at a fixed position on said vehicle and receiving said output signals, a receiver having a detector which detects said signals from said transmitter, said receiver further comprising an LF amplifier which selectively amplifies pulse signals within said pulse frequency band and attenuates signal outside said pulse frequency band, a rectifier integrating the rectifier pulses thereby generating a control voltage, means operatively connecting said receiving antenna to said receiver, and indicating means operatively connected to said receiver and being activated by said control voltage.

* * * * *

UNITED STATES PATENT OFFICE
CERTIFICATE OF CORRECTION

Patent No. 3,810,090          Dated May 7, 1974

Inventor(s) Henry Davis, Jr. and Donald E. Church

It is certified that error appears in the above-identified patent and that said Letters Patent are hereby corrected as shown below:

Col. 6, line 45, a period should appear after "received"; lines 46 and 47 should be cancelled in entirety.
    Col. 10, line 6, after "100" the word "or" should be cancelled and -- , that is, -- inserted in place;
    line 7, "substantially poor" should be -- rapid --;
    lines 8 and 9, "poor capacitor" should be -- rapid dissipation rate --.
    Col. 20, lines 4 and 5, "Docket No. R-96" should be cancelled; after "Murphy" the words -- , Serial No. 289,698, filed September 15, 1972 -- should be inserted;
    line 8, "Docket No. R-97," should be cancelled and -- Serial No. 289,540 of -- inserted in place; after "Church" the words -- filed September 15, 1972 -- should appear;
    line 11, "Docket R-98," should be cancelled and -- 289,699 of -- inserted in place;
    line 12, after "Brobeck" the words -- filed September 15, 1972 -- should be inserted;
    line 15, the word -- of -- should appear in place of "Docket No. R-99,";
    line 16, after "Brobeck" the words -- filed September 15, 1972 -- should be inserted;
    line 19, the word -- of -- should appear in place of "Docket No. R-100,"; after "Hill" the words -- filed September 15, 1972 -- should be inserted.

Signed and sealed this 7th day of January 1975.

(SEAL)
Attest:

McCOY M. GIBSON JR.
Attesting Officer

C. MARSHALL DANN
Commissioner of Patents

UNITED STATES PATENT AND TRADEMARK OFFICE
CERTIFICATE OF CORRECTION

PATENT NO. : 3,810,090
DATED : May 7, 1974
INVENTOR(S) : Henry Davis, Jr., and Donald E. Church It is certified that error appears in the above-identified patent and that said Letters Patent are hereby corrected as shown below:

Claim 1, line 46, the word "only" should be deleted; line 47, the word "only" should be inserted before "during".

Signed and Sealed this

Tenth Day of August 1976

[SEAL]

Attest:

RUTH C. MASON
Attesting Officer

C. MARSHALL DANN
Commissioner of Patents and Trademarks